(12) United States Patent
Mills

(10) Patent No.: US 10,183,659 B2
(45) Date of Patent: Jan. 22, 2019

(54) VEHICLE UNDERSIDE IMPACT AVOIDANCE

(71) Applicant: Ford Global Technologies, LLC, Dearborn, MI (US)

(72) Inventor: Aaron L. Mills, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 14/552,456

(22) Filed: Nov. 24, 2014

(65) Prior Publication Data

US 2016/0144847 A1 May 26, 2016

(51) Int. Cl.
| | | |
|---|---|---|
| B62D 6/00 | (2006.01) |
| G06K 9/00 | (2006.01) |
| B60W 30/09 | (2012.01) |
| B60W 30/14 | (2006.01) |
| B60W 10/20 | (2006.01) |
| B60W 10/06 | (2006.01) |
| B60W 10/184 | (2012.01) |
| B60W 40/06 | (2012.01) |

(52) U.S. Cl.
CPC .......... *B60W 10/06* (2013.01); *B60W 10/184* (2013.01); *B60W 40/06* (2013.01); *B60W 2420/42* (2013.01); *B60W 2422/95* (2013.01); *B60W 2520/10* (2013.01); *B60W 2550/10* (2013.01); *B60W 2720/10* (2013.01)

(58) Field of Classification Search
CPC .............................. B60W 10/18; B60W 10/06
USPC ...... 701/36, 45, 48, 70, 78, 79, 93; 340/933, 340/937, 435, 436
See application file for complete search history.

(56) References Cited

U.S. PATENT DOCUMENTS

| | | | |
|---|---|---|---|
| 6,683,539 B2 | 1/2004 | Trajkovic et al. | |
| 8,487,782 B2 | 7/2013 | Pampus et al. | |
| 2002/0191837 A1* | 12/2002 | Takeda | G01C 11/06 382/154 |
| 2007/0219720 A1* | 9/2007 | Trepagnier | B60W 30/00 701/300 |
| 2011/0057813 A1 | 3/2011 | Toledo et al. | |
| 2012/0245798 A1* | 9/2012 | Coats | G01S 7/412 701/42 |
| 2013/0116905 A1* | 5/2013 | Lucking | B60Q 9/006 701/70 |

(Continued)

FOREIGN PATENT DOCUMENTS

| | | |
|---|---|---|
| CN | 103386975 A | 11/2013 |
| KR | 20130047357 | 5/2013 |

OTHER PUBLICATIONS

Notification of First Office Action from the State Intellectual Property Office (SIPO) of the People's Republic of China regarding Application No. 201510801080.5 dated Dec. 5, 2018 (3 pages).

*Primary Examiner* — Adam D Tissot
(74) *Attorney, Agent, or Firm* — Frank A. MacKenzie; Bejin Bieneman PLC

(57) ABSTRACT

A camera is configured to be mounted facing a front of a vehicle. A computer is programmed to receive first and second images from the camera, determine a height of an obstacle located to the front of the vehicle using at least the first and second images, and, based at least in part on the height of the obstacle, send an instruction via a communications bus to a component controller to control a speed of the vehicle.

18 Claims, 3 Drawing Sheets

(56) References Cited

U.S. PATENT DOCUMENTS

2013/0261951 A1 10/2013 Sekiguchi et al.
2015/0086080 A1* 3/2015 Stein .................. G06K 9/00798
382/104

* cited by examiner

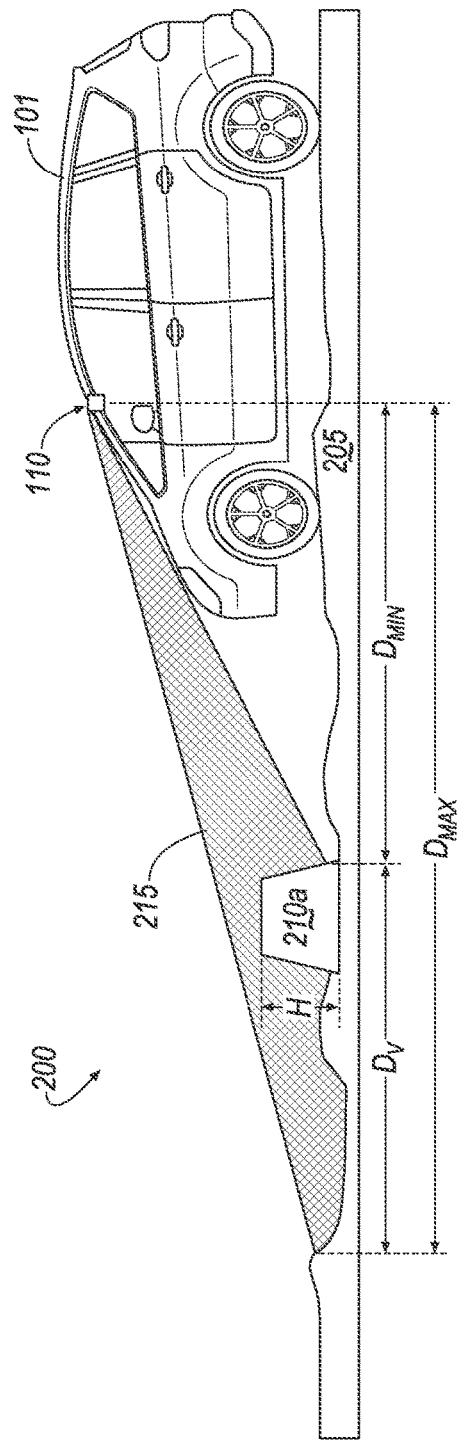
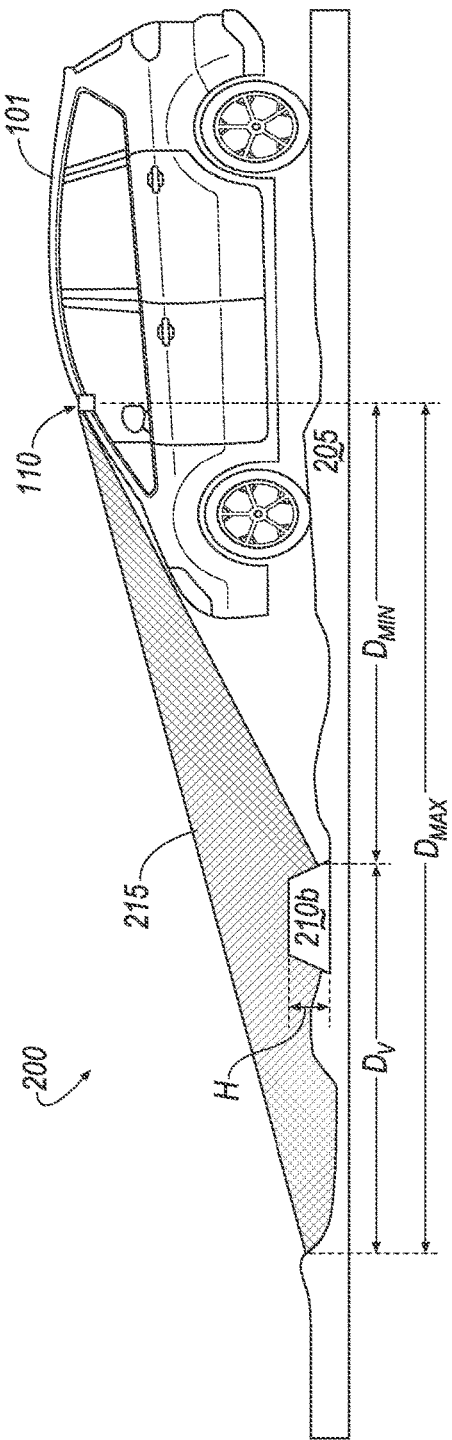

VEHICLE UNDERSIDE IMPACT AVOIDANCE

BACKGROUND

Even at low speeds, vehicle front fascia or underbody damage can be caused when the driver pulls too far forward into a parking space with a high curb, goes over a speed bump, encounters a bump or other obstacle in a roadway, etc. Accordingly, a mechanism for avoiding impacts that can cause damage to a vehicle underside would be useful.

DRAWINGS

FIG. 2 illustrates an exemplary vehicle operating environment including an obstacle that poses a risk of underside damage.

FIG. 3 illustrates an exemplary vehicle operating environment including an obstacle that does not pose a risk of underside damage.

DETAILED DESCRIPTION

System Overview

Figure 1:
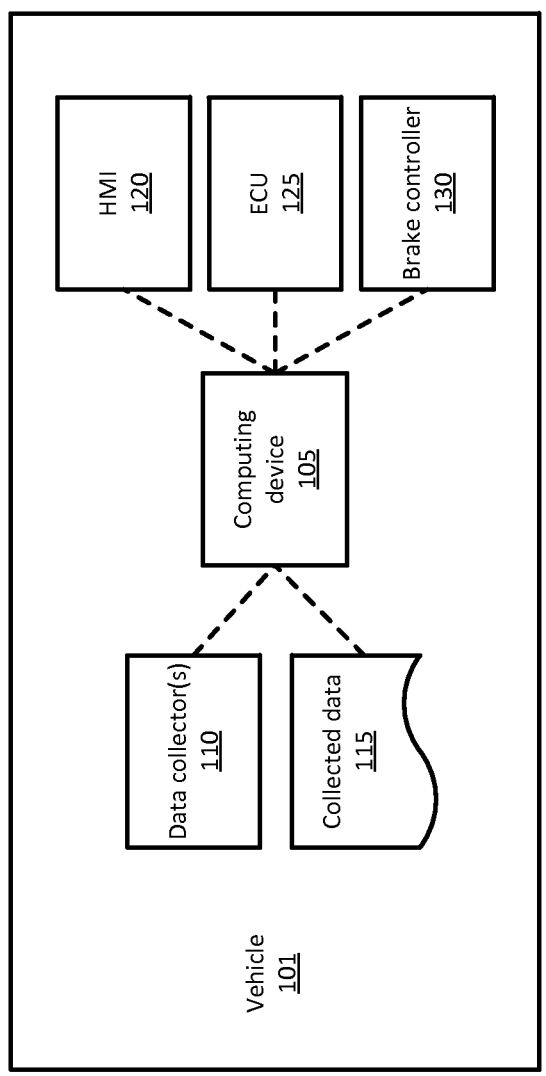
FIG. 1 is a block diagram of an exemplary vehicle equipped for underside impact avoidance.

FIG. 1 is a block diagram of an exemplary vehicle 101 equipped for curb detection and monitoring. The vehicle 101 generally includes one or more sensor data collectors 110, in particular video cameras, that may be used to provide data 115 to a vehicle computer 105 during vehicle 101 operations, e.g., when driving at relatively slow speeds, e.g., less than 15 kilometers per hour. Advantageously, the computer 105 may be programmed to use the data 115 to detect a curb, bump, or other obstacle, and moreover may be configured to determine whether the obstacle extends from a driving surface, e.g., a roadway, parking lot, etc., at a height that poses a risk of impacting and/or damaging a vehicle underside, e.g., fascia, underbody, etc. The computer 105 may further be programmed to provide an instruction to a component controller in the vehicle 101 to mitigate the risk posed by the obstacle, e.g., to an engine controller 125 to alter a vehicle 101 throttle, to a brake controller 130 to apply brakes, e.g., auto-brake functionality, etc. Yet further, the computer 105 may be configured to provide an alert via a human machine interface (HMI) 120 in the vehicle 101.

Exemplary System Elements

As stated above, a vehicle 101 includes a vehicle computer 105. The vehicle 101 is generally a land-based vehicle having three or more wheels, e.g., a passenger car, light truck, etc. The computer 105 generally includes a processor and a memory, the memory including one or more forms of computer-readable media, and storing instructions executable by the processor for performing various operations, including as disclosed herein. Further, the computer 105 may include and/or be communicatively coupled to more than one computing device, e.g., controllers or the like included in the vehicle 101 for monitoring and/or controlling various vehicle components, e.g., an engine control unit, transmission control unit, etc. The computer 105 is generally configured for communications on one or more vehicle 101 communications mechanisms, e.g., a controller area network (CAN) bus or the like. The computer 105 may also have a connection to an onboard diagnostics connector (OBD-II).

Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110, an engine control unit (ECU) 125, a brake controller 130, etc. Alternatively or additionally, in cases where the computer 105 actually comprises multiple devices, the CAN bus or the like may be used for communications between devices represented as the computer 105 in this disclosure. In addition, the computer 105 may be configured for communicating with other devices via various wired and/or wireless networking technologies, e.g., cellular, Bluetooth, a universal serial bus (USB), wired and/or wireless packet networks, etc.

The vehicle 101 generally includes at least one camera data collector 110. For example, a camera data collector 110 could be equipped to obtain still and/or video images, and could be a mono or stereo camera. As best illustrated in FIGS. 2 and 3, a camera data collector 110 is generally mounted at a front of the vehicle 101, e.g., at a central top location of a vehicle 101 windscreen, so as to provide a field of vision 215. As discussed further below, the field of vision 215 includes a portion of an operating surface 205 for the vehicle 205, whereby the camera 110, possibly in conjunction with one or more other data collectors 110, can provide data 115 by which the computer 105 can determine a height of an obstacle 210 in front of the vehicle 101, and whether the obstacle 210 risks damages to an underside of the vehicle 101.

As already mentioned, data collectors 110 could include a variety of devices in addition to one or more camera data collectors 110. For example, data collectors 110 can include ultrasonic sensor data collectors 110, and/or other data collectors 110 that collect dynamic vehicle 101 data, such as velocity, yaw rate, steering angle, etc. Further, the foregoing examples are not intended to be limiting; other types of data collectors 110 could be used to provide data 115 to the computer 105. For example, various controllers in a vehicle may operate as data collectors 110 to provide data 115 via the CAN bus, e.g., data 115 relating to vehicle speed, acceleration, location, etc.

A memory of the computer 105 generally stores collected data 115 in addition to program instructions for carrying out operations including as described herein. Collected data 115 may include a variety of data collected in a vehicle 101. Examples of collected data 115 include measurements, and/or calculations from such measurements, of distances and/or heights of objects, e.g., potential obstacles 210 such as curbs, bumps, etc. In general, collected data 115 may include any data that may be gathered by a collection device 110 and/or computed from such data.

The vehicle 101 generally includes a human machine interface (HMI) 120. In general, the HMI 120 is equipped to accept inputs for, and/or provide outputs from, the computer 105. For example, the vehicle 101 may include one or more of a display configured to provide a graphical user interface (GUI) or the like, an interactive voice response (IVR) system, audio output devices, mechanisms for providing haptic output, e.g., via a vehicle 101 steering wheel or seat, etc. Further, a user device, e.g., a portable computing device such as a tablet computer, a smart phone, or the like, may be used to provide some or all of an HMI 120 to a computer 105. For example, a user device could be connected to the computer 105 using technologies discussed above, e.g., USB, Bluetooth, etc., and could be used to accept inputs for and/or provide outputs from the computer 105. In any case the HMI 120 could provide output concerning obstacles 210, e.g., describing a height, distance, etc. of the obstacle 210, whether the obstacle 210 poses a risk to the vehicle 101, etc. Further, implementations are possible in which the HMI 120 is used accept input to start a process of detecting obstacles 210, as mentioned below.

ECU 125 is an engine control unit such as is known, e.g., including a processor and a memory, and programmed to provide instructions controlling a vehicle 101 powertrain and/or engine. For example, the ECU could receive an instruction via a vehicle 101 CAN bus or the like regarding an appropriate throttle level, amount of torque, etc., for the vehicle 101 powertrain. Further, the computer 105 could be programmed to provide such instruction based on detection of an obstacle 210.

Brake controller 130 generally includes a processor and a memory, and is programmed to provide instructions to control vehicle 101 breaks, e.g., as is known. For example, the brake controller 130 could receive an instruction vehicle a vehicle 101 CA and bus or the like regarding application of vehicle 101 brakes, and could be programmed to provide such instruction based on detection of an obstacle 210.

FIGS. 2 and 3 illustrate an exemplary vehicle 101 operating environment 200 including a roadway 205 having thereon an obstacle 210 that could pose a risk of underside damage to the vehicle 101. For example, FIG. 2 shows an obstacle 210a of a sufficient height to damage a vehicle 101 underside, such as a fascia or underbody. FIG. 3, in contrast, shows an obstacle 210b not having a height likely to damage the vehicle 101 underside.

As also illustrated in FIGS. 2 and 3, a camera data collector 110 generally has a field of vision 215. With respect to a distance in front of the vehicle 101 measured along a longitudinal axis of the vehicle 101, the field of vision 215 begins at a distance $D_{min}$ and ends at a distance $D_{max}$. A viewing distance $D_v$, also measured along the longitudinal axis of the vehicle 101, is defined as a difference between $D_{max}$ and $D_{min}$. It will be understood that the viewing distance may depend on capabilities of a particular camera data collector 110, e.g., a viewing angle of a camera 110 lens, etc. Further, the camera data collector 110 generally captures a generally rectangular viewing area on a surface 205 defined by the viewing distance $D_v$ and a width perpendicular to the viewing distance $D_v$, the viewing area being provided according to capabilities of a particular camera data collector 110.

Exemplary Process Flows

Figure 4:
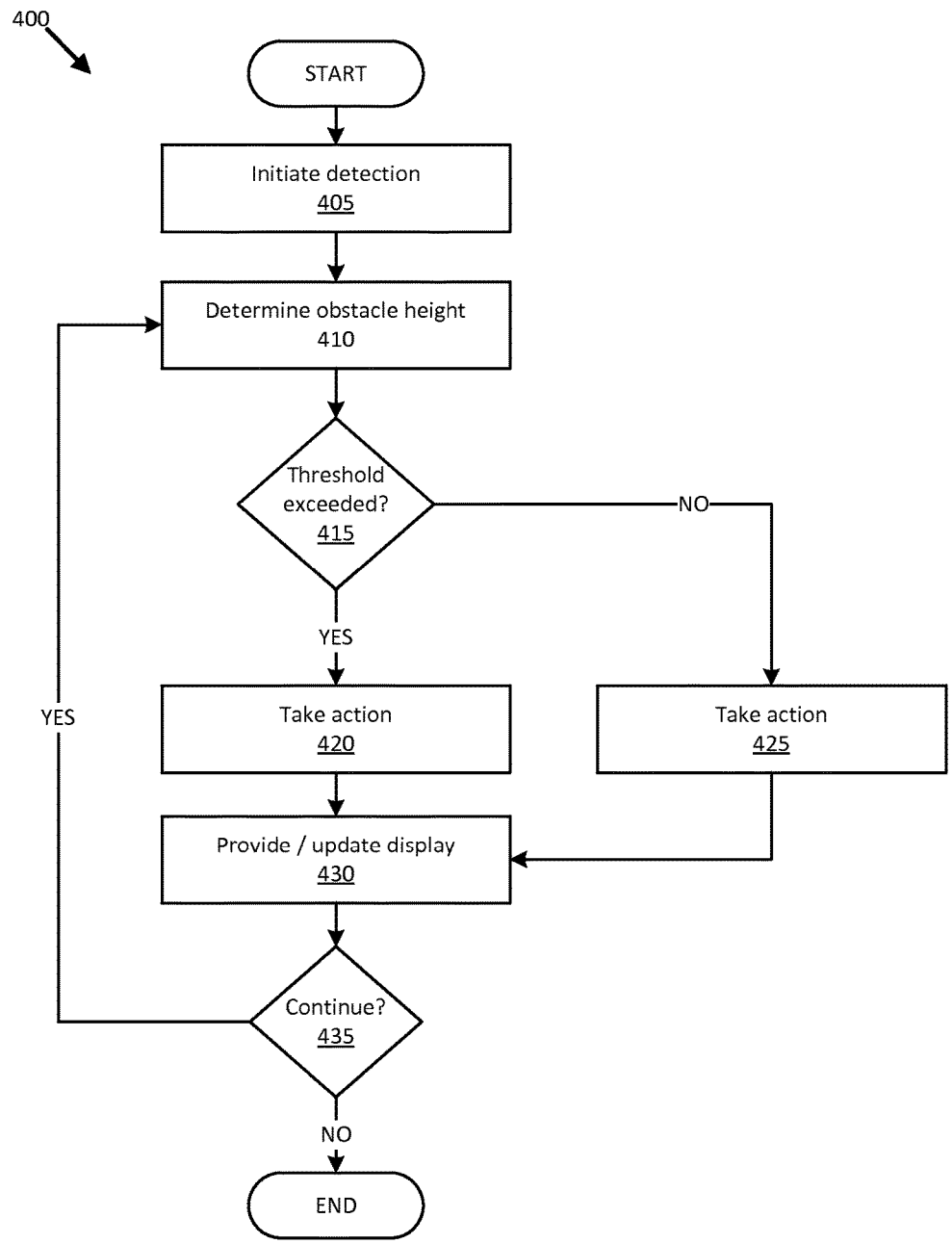
FIG. 4 is a process flow diagram of an exemplary process for avoiding underside impacts.

FIG. 4 is a process flow diagram of an exemplary process 400 for avoiding underside impacts. The process 400 begins in a block 405, in which the computer 105 initiates detection of obstacles 210. For example, in one implementation, the process 400 is initiated when vehicle 101 speed drops below a predetermined threshold, e.g., 15 kilometers per hour. Alternatively or additionally, the underside impact avoidance process 400 could be initiated according to input received via the HMI 120, e.g., indicating that a parking operation is being commenced, that a vehicle 101 is traversing an operating surface potentially including obstacles 210 such as speed bumps or the like, global positioning system (GPS) data 115 could be used to indicate that a vehicle 101 was near a parking area, and operating surface 205 including speed bumps or other obstacles 210, etc.

Next, in a block 410, the computer 105 determines a height of an obstacle 210 in the viewing area. For example, the computer 105 may receive collected data 115 that can be used to construct what may be referred to as a "texture map" of the viewing area. That is, if the viewing area is a rectangular surface, it can be assigned X and Y coordinates, and heights, e.g., a distance above a height of operating surface 205 on which a vehicle 101 rests, can be assigned to various X-Y locations on the texture map, i.e., within the viewing area. Further, an obstacle 210 height H for a viewing area could be defined as a greatest height of an object in the viewing area, e.g., a greatest height associated with an X-Y coordinate on the texture map. That height could be identified as an obstacle 210 height for the viewing area. Such data 115 generally includes images and could include other data, such as data from ultrasonic sensors, radar, lidar, or other data collectors 110.

Accordingly, obstacle 210 height could be determined in a variety of ways. For example, in one implementation, a camera data collector 110 could provide two or more images of a viewing area at successive points in time. Further, collected data 115, in addition to the images, could include a velocity, e.g., an average velocity, of the vehicle 101 between first and last such points in time. A height of an obstacle 210 could then be determined from such images, e.g., in a known manner. For example, a first image of an obstacle 210 at the minimum distance $D_{min}$ could be compared to a second image of the obstacle 210 at the maximum distance $D_{max}$, and a height H of the obstacle 210 then determined by accounting for a change in apparent heights of the obstacle 210 in the respective first and second images over the distance $D_v$, which distance $D_v$ can be determined based on the vehicle 101 velocity. That is, a change over time in apparent heights of the obstacle 210 in the first and second images between the distances $D_{min}$ and $D_{max}$ could, as will be understood, be used to determine an absolute or actual height H of the obstacle 210. Alternatively or additionally, additional data 115 could be used to construct a texture map, e.g., ultrasonic sensor data collectors 110 or the like could be used. Further, as mentioned above, a stereo camera data collector 110 could be used, e.g., providing two images at a single time to measure the height H, e.g., in a known manner.

Further, in addition to the height H, note that the computer 105 could use images or other data 115 to determine a slope of an obstacle 210. For example, a slope can be inferred, as is known, by measuring respective heights of an obstacle 210 at various distances, i.e., at least two distances, from a vehicle 101, and then determining a slope based on a change in the heights.

Following the block 410, in a block 415, the computer 105 determines whether an obstacle 210 in the viewing area has a height H exceeding a threshold height. For example, a threshold height could be determined according to a clearance required to avoid an impact to an underside of the vehicle 101, e.g., a fascia or an underbody. The threshold height could be stored in a memory of the computer 105. If the threshold height is exceeded, then a block 420 is executed next. Otherwise, the process 400 proceeds to a block 425. Note that in addition to the threshold height, the computer 105 in the block 410 could consider a threshold slope of the obstacle 210. Moreover, a threshold height and a threshold slope could be dependent on one another. For example a threshold height without any consideration of a threshold slope could be a height required for vehicle 101 underbody clearance, but a smaller threshold height could be used for slopes greater than a predetermined threshold, e.g., 30 degrees, 45 degrees, etc.

In the block 420, which may follow the block 415, the computer 105 provides an instruction to avoid an impact between the vehicle 101 and the detected obstacle 210 having a height H exceeding the threshold height. For example, the computer 105 could send an instruction to the brake controller 132 apply vehicle 101 braking. The instruction could be dependent on an obstacle 210 slope as well as a height, e.g., if an obstacle 210 has a slope in a certain range, e.g., substantially ninety degrees, greater braking may be required, whereas slopes below a certain threshold, e.g., ten degrees or less, may warrant more gentle braking. Additionally or alternatively, by way of further example, the computer 105 could instruct the ECU 125 to reduce a vehicle 101 throttle. An amount of braking, throttle reduction, etc., to be applied could depend on a stopping distance of the vehicle 101 at a current velocity of the vehicle 101, and/or on an obstacle 210 slope. Following the block 420, the process 400 proceeds to a block 430.

In a block 425, which may follow the block 415, the computer 105 may take action based on a determination that the detected obstacle 210 has a height H at or below the threshold height. In some cases, the block 425 may be omitted and/or the computer 105 may be programmed to take no action. However, in some implementations, the computer 105 may be programmed to control a vehicle 101 speed when a vehicle 101 is within a predetermined distance of an obstacle 210. For example, it may be convenient to program the computer 105 to slow, e.g., brake, the vehicle 101 when the vehicle 101 is close to a parking curb or the like, even if the parking curb is not an obstacle 210 that would damage a vehicle 101 fascia or underside. In this context, "close" could mean when the vehicle 101 is within a half a meter or less of an obstacle 210, so that breaking results in a vehicle 101 tires being within a distance of 10 centimeters or less when the vehicle 101 stops proximate to the obstacle 210.

In a block 430, following the block 420, the computer 105 may update the HMI 120 concerning a status of the process 400. For example, if the block 430 is reached following the block 415, the HMI 120 could indicate "Obstacle Detection in Progress," or some similar message. On the other hand, if the block 430 is reached following the block 420, the HMI 120 could indicate "Alert—Potential Obstacle Impact," "Warning—Obstacle Avoidance Implemented," and/or some other similar message. Yet further, if the block 430 is reached following the block 425, the HMI 120 could indicate "Approaching Parking Curb," and/or some other similar message.

Following the block 430, in a block 435, the computer 105 determines whether the process 400 should continue. For example, the vehicle 101 could be powered off, user input could be received indicating that the process 400 is to be ended, the vehicle 101 could be stopped, placed in a "Park" mode, etc. If the process 400 should continue, then the process 400 returns to the block 410. Otherwise, the process 400 ends.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

As used herein, the adverb "substantially" modifying an adjective means that a structure or process may deviate from an exact described geometry, shape, timing, etc., because of imperfections in materials, machining, manufacturing, processing and/or processing speeds, network connectivity, etc.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system for installation in a vehicle, comprising:
a camera configured to be mounted facing a front of the vehicle; and
a computer that includes a processor and a memory, and that is programmed to:
receive first and second images from the camera;
determine a height of an obstacle located to the front of the vehicle using at least the first and second images; and
based at least in part on the height and a slope of the obstacle, send an instruction via a communications bus to a component controller to control a speed of the vehicle.

2. The system of claim 1, wherein the instruction to the component controller is an instruction to reduce vehicle speed.

3. The system of claim 1, wherein the component controller is one of a brake controller and an engine controller.

4. The system of claim 1, wherein the computer is further programmed to generate a texture map recording heights of a plurality of points in a viewing area of the camera, wherein the obstacle height is included in the texture map.

5. The system of claim 4, wherein the obstacle height is determined according to a highest point in the texture map.

6. The system of claim 1, wherein the computer is programmed to determine the height of the obstacle when the vehicle is moving at a speed below a predetermined threshold.

7. The system of claim 1, wherein the computer is programmed to determine the height of the obstacle at least in part by determining first and second distances of the vehicle from the obstacle in the first second images, respectively, and using a comparison of the images and the distances to determine the height of the obstacle.

8. The system of claim 1, further comprising at least one non-camera sensor, wherein the computer is further programmed to use data from the non-camera sensor in addition to the first and second images in determining the height of the obstacle.

9. The system of claim 1, further comprising at least one second camera, wherein the computer is further programmed to receive at least one third image from the at least one second camera, and to use the third image in determining the height of the obstacle.

10. A method, comprising:
receiving first and second images from a camera mounted in a vehicle;
determining a height of an obstacle located to the front of the vehicle using at least the first and second images; and
based at least in part on the height and a slope of the obstacle, sending an instruction via a communications bus to a component controller to control a speed of the vehicle.

11. The method of claim 10, wherein the instruction to the component controller is an instruction to reduce vehicle speed.

12. The method of claim 10, wherein the component controller is one of a brake controller and an engine controller.

13. The method of claim 10, further comprising generating a texture map recording heights of a plurality of points in a viewing area of the camera, wherein the obstacle height is included in the texture map.

14. The method of claim 13, wherein the obstacle height is determined according to a highest point in the texture map.

15. The method of claim 10, further comprising determining the height of the obstacle when the vehicle is moving at a speed below a predetermined threshold.

16. The method of claim 10, further comprising determining the height of the obstacle at least in part by determining first and second distances of the vehicle from the obstacle in the first second images, respectively, and using a comparison of the images and the distances to determine the height of the obstacle.

17. The method of claim 10, further comprising receiving data from at least one non-camera sensor, and using data from the non-camera sensor in addition to the first and second images in determining the height of the obstacle.

18. The method of claim 10, further comprising receiving at least one third image from at least one second camera, and to using the third image in determining the height of the obstacle.

* * * * *